United States Patent [19]
Lee et al.

[11] 3,953,587

[45] Apr. 27, 1976

[54] ZEOLITE CATALYST FOR DILUTE ACID GAS TREATMENT VIA CLAUS REACTION

[75] Inventors: Hanju Lee; Chang Whan Chi, both of Columbia, Md.

[73] Assignee: W. R. Grace & Co., Columbia, Md.

[22] Filed: Nov. 27, 1974

[21] Appl. No.: 527,620

[52] U.S. Cl. .............................. 423/576; 423/328; 55/73; 55/75; 252/455 Z
[51] Int. Cl.² ........................................ C01B 17/04
[58] Field of Search ........... 423/230, 573, 574, 576, 423/328; 55/73, 75; 252/455 Z

[56] References Cited
UNITED STATES PATENTS

| | | | |
|---|---|---|---|
| 1,892,999 | 1/1933 | Ralston et al. | 423/576 |
| 3,363,401 | 1/1968 | Jean-Pierre et al. | 423/230 X |
| 3,864,452 | 2/1975 | Chi et al. | 423/573 X |
| 3,864,460 | 2/1975 | Connell | 423/574 |

*Primary Examiner*—G. O. Peters
*Attorney, Agent, or Firm*—Kenneth E. Prince; Arthur P. Savage

[57] ABSTRACT

Certain zeolite materials have been found to be effective zeolite adsorbents-catalysts for the adsorption and conversion of sulfuric compounds to elemental sulfur. These zeolites adsorb hydrogen sulfide and sulfur oxides and promote the reaction of these materials so as to produce sulfur. These useful zeolites are the hydrogen forms of the zeolite materials and sodium exchanged hydrogen zeolites, especially mordenite. These zeolite adsorbents-catalysts are very useful for the removal of small amounts of hydrogen sulfide and sulfurous oxide from effluent streams such as effluent streams from Claus reactors.

10 Claims, 1 Drawing Figure

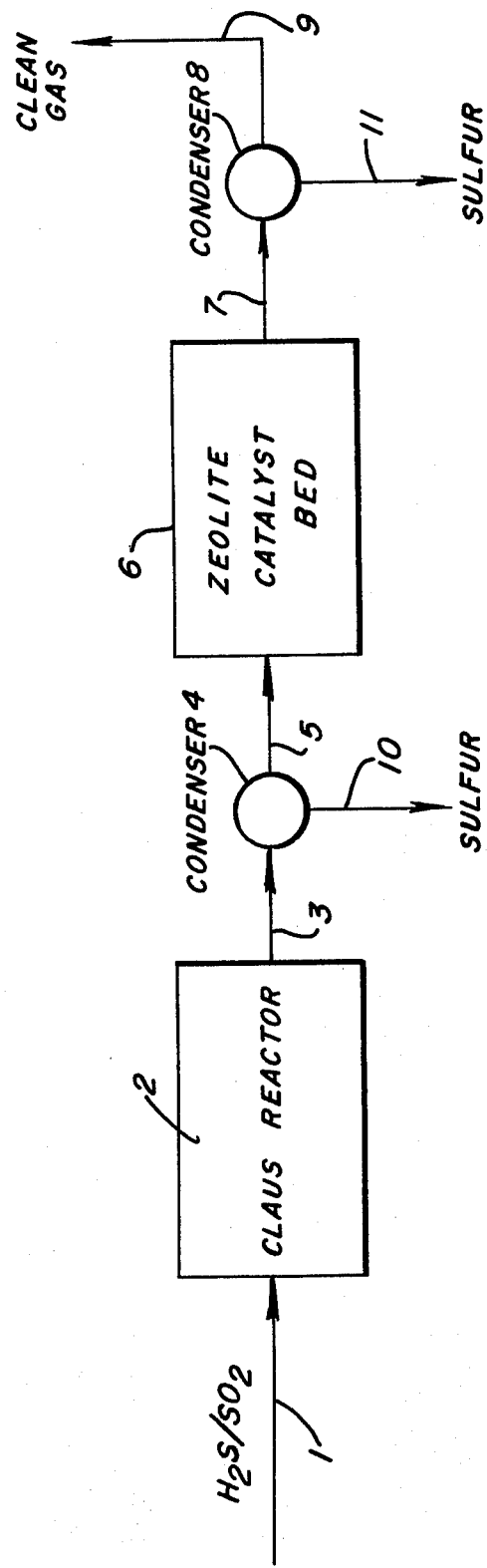

ZEOLITE CATALYST FOR DILUTE ACID GAS TREATMENT VIA CLAUS REACTION

This invention relates to the use of new zeolite adsorbents-catalysts used for the removal of small amounts of hydrogen sulfide and sulfur oxide from process effluent streams. More particularly this invention is directed to zeolite adsorbents-catalysts for the removal of low parts per million (ppm) level hydrogen sulfide and sulfurous oxide from the effluent from Claus reactors. In a further embodiment, this invention is directed to a method for the purification of the effluent gas stream from Claus reactors.

It is well known that hydrogen sulfide is deleterious to the general environment and is harmful to the health of workers in various industrial plants and areas. It has been an accepted fact that this material must be removed from process effluent streams before these streams are allowed to pass into the atmosphere. The well-known process for this cleanup is the Claus process, which consists of burning a part of hydrogen sulfide to produce sulfur dioxide and passing the remainder of the hydrogen sulfide together with the produced sulfur dioxide over an alumina catalyst which promotes oxidation of the hydrogen sulfide by the sulfur dioxide to yield elemental sulfur and water. A Claus reactor in good operating condition will convert up to about 97 percent of the hydrogen sulfide and sulfurous oxides to elemental sulfur and water. Generally the degree of conversion which can be expected from a Claus reactor is in the range of about 80 percent to about 95 percent. Such a significant removal of hydrogen sulfide from the atmosphere has up to this time been quite sufficient. However, now, with greater emphasis put on the environment, the amounts of hydrogen sulfide and sulfur oxide which can be passed into the air has been decreased. Generally the level must be less than 1300 ppm. It is now necessary to reduce the amount of these gases in an effluent gas stream to below about 1000 ppm and preferably to below about 300 ppm. This can only be accomplished in an operation subsequent to the Claus reactor.

It has been suggested in the prior art to use a series of Claus reactors to reduce the level of hydrogen sulfide and sulfur oxide. Claus reactors with conventional alumina catalysts, however, are not very efficient when operating on gas streams carrying low levels of hydrogen sulfide and sulfur oxide. However, it has been found that certain zeolite adsorbents-catalysts are very efficient in the conversion of low levels of hydrogen sulfide and sulfur oxide to elemental sulfur and water. The useful zeolites for this purpose are the hydrogen forms of the zeolites and the sodium ion exchanged hydrogen form of zeolites. The hydrogen exchanged form of zeolites is a very acid and thermally stable form. These have a good conversion for the reaction of those levels of hydrogen sulfide and sulfur oxide. Sodium ion exchanged hydrogen zeolites have a similar high acid and thermal stability and an increased activity for the conversion of hydrogen sulfide and sulfur oxides to elemental sulfur. These zeolites will produce a product gas having less than 100 ppm of sulfur compounds.

Broadly, the invention consists of passing a gas stream having a low level of hydrogen sulfide and sulfur oxides, such as the effluent gas stream from a Claus reactor, to a zeolite bed wherein the zeolite is a hydrogen form of a zeolite or a sodium ion exchanged form of hydrogen zeolite. The zeolite bed is maintained at about 400°F to 700°F, whereby the hydrogen sulfide and sulfur oxides react to produce elemental sulfur and water. The flow of gas is continued to the zeolite adsorbent bed until its capacity is exhausted or nearly exhausted due to an accumulated deposit of elemental sulfur or formation of sulfur compounds on the catalyst surface. The zeolite material is then heated to the range of about 800°F to 1000°F whereby the elemental sulfur is vaporized and removed from the zeolite materials. This step regenerates the zeolite so that it can be used for further conversion of hydrogen sulfide and sulfur oxides to elemental sulfur and water.

The FIGURE is a schematic view of a process for the cleanup of an effluent gas from a Claus reactor.

The invention will now be discussed, with particular reference to the above drawing. It has been found that the hydrogen form of zeolites and sodium ion exchanged hydrogen zeolites, especially mordenite, are very active in the conversion of low levels of hydrogen sulfides and sulfur oxides to elemental sulfur and water. At gas concentrations of below about 3 volume percent of hydrogen sulfide and sulfur oxides, these zeolites adsorbents-catalysts will reduce the contaminant level of the gas to below about 250 to 1000 ppm. The high acid and thermal stability of these zeolites is required during the steps of regeneration. Regeneration consists of heating the zeolite to about 800°F to 1000°F in an environment which includes sulfur acids. Zeolite materials which do not have a high acid stability are attacked by the acid at this temperature, lose their crystallinity and are fully ineffective for use in another process cycle. With reference to the FIGURE, inlet conduit 1 passes a hydrogen sulfide - sulfur oxide mixture to a Claus reactor. The Claus reactor consists of an alumina catalyst which converts the hydrogen sulfide and sulfur oxide to elemental sulfur and water. The temperature in the Claus reactor is in the range of about 500°F to 700°F. The effluent gas from the Claus reactor exits from conduit 3 and passes to condenser 4. The condenser will remove any elemental sulfur from this gas stream. This gas then passes by means of conduit 5 to the zeolite adsorbent-catalyst zone 6. This zeolite adsorbent-catalyst zone is maintained at a temperature of from about 400°F to 700°F and preferably at 550°F to 650°F whereby the low levels of hydrogen sulfide and sulfur oxides which are present in the gas stream are further catalytically converted to elemental sulfur and water. The hourly space velocity of gas through the zeolite adsorbent-catalyst zone may vary from 100 to 500 and is preferably about 150 to 200 vol./vol./hr. The clean gas, which now contains less than 1000 ppm of hydrogen sulfide and sulfur oxides, passes by means of conduit 7 to condenser 8, which removes any elemental sulfur from the stream prior to allowing the clean gas to exit to the atmosphere through conduit 9. The zeolite adsorbent-catalyst bed is regenerated periodically by heating this bed to a temperature of about 800°F to about 1000°F, preferably about 850°F to about 950°F, to vaporize and remove substantially all of the elemental sulfur and sulfur compounds from the zeolite surface. It is preferred that a purge gas be used during this regeneration period. The function of the purge gas is to flow the sulfur vapors through condenser 8 where it is removed from the system via conduit 11. Any of the inert gases or nitrogen may preferably be used as the purge gas medium.

The zeolite adsorbents-catalysts which may be effectively used in this process comprise the hydrogen forms of zeolites, sodium ion exchanged hydrogen zeolites, and especially the sodium exchanged hydrogen form of mordenite. The useful zeolite materials used in the hydrogen exchanged form are zeolite X, zeolite Y, zeolite L, zeolite T, zeolite ZK-4, mordenite, erionite, offretite, ferrierite, chabazite, clinoptilolite and gmelinite. The zeolites which have a high silica to alumina ratio have generally greater thermal and acid stability than zeolites with a lower silica to alumina ratio. The naturally occurring or synthetically produced forms of these zeolites can be used with equal results.

The hydrogen forms of these zeolites which are usually produced synthetically in an alkali form and which occur naturally in alkali form, are produced by means of contacting the zeolites with a hydrogen ion containing solution or a hydrogen ion yielding material such as the ammonium ion. That is, an ammonium ion compound can be exchanged for the alkali in the zeolite material and subsequently, when the zeolite material is heated, the ammonium ion compound decomposes and converts the zeolites to the hydrogen form. The various methods for converting zeolite materials which are conventionally in an alkali metal form to the hydrogen form, are well known. A zeolite for use in the present process can be converted to the hydrogen form using any of these known processes as long as the degree of replacement of alkali ion by hydrogen ion is at least 70 mole percent, and preferably 90 mole percent. When sodium exchanged hydrogen zeolite is produced, the hydrogen exchanged zeolite is then contacted with a sodium salt solution, usually a sodium chloride or a sodium sulfate solution. This contacting is continued until sodium ions have replaced at least half of the hydrogen ions of the zeolite.

As an illustration, synthetic mordenite is commercially produced in the sodium form, and the hydrogen form of mordenite is produced by treating the sodium form of mordenite with an acid solution, preferably hydrochloric acid. The sodium ion exchanged form of hydrogen mordenite referred to here is a zeolite produced by treating the hydrogen form of mordenite in a sodium ion containing solution to exchange a significant amount of the hydrogen ions with sodium ions. It was found that the sodium ion exchanged hydrogen mordenite is greatly superior to sodium mordenite in its original form, in its catalytic activity, as well as its rate of degradation.

The invention will be further amplified by reference to the following example.

EXAMPLE 1

This example compares the time for breakthrough of hydrogen sulfide and sulfur oxides from various adsorbents-catalysts. The simulated Claus reactor off-gas composition was as follows:

| | | |
|---|---|---|
| hydrogen sulfide | - | 2.6 vol. % |
| sulfur dioxide | - | 1.3 vol. % |
| carbon dioxide | - | 5.0 vol. % |
| water | - | 10 vol. % |
| nitrogen | - | balance |

This gas composition, which is similar in composition to a Claus reactor off-gas, is fed to a tube 1 inch in diameter and 13 inches in length which contains the adsorbent-catalyst. The gas pressure is 20 psig, and the hourly space velocity is 160 vol./vol./hr. The tube temperature during the flow of gas for adsorbtion and conversion is 600°F, and for regeneration 900°F. The following Table gives the average breakthrough time in minutes for a given effluent sulfur compound concentration for approximately 10 process cycles. Average breakthrough time is defined by the average length of time at which the sulfur content of the effluent reaches the specified value due to fouling of the adsorbent-catalyst bed. A process cycle consists of an adsorption-conversion at 600°F and a regeneration at 900°F.

Table 1

| Adsorbent-Catalyst | Breakthrough time at various effluent sulfur contents (min) | | |
|---|---|---|---|
| | 250 ppm | 500 ppm | 1000ppm |
| Alumina | 47 | 54 | 61 |
| H-Ferrierite | 50 | 68 | 92 |
| Na Exchanged H-Mordenite | 64 | 86 | 114 |
| Ferrierite | 25 | 34 | 53 |
| Na Exchanged H-Ferrierite | 38 | 50 | 77 |
| Na Zeolite X | Degraded and Lost Crystallinity and Effectiveness | | |
| Na Mordenite | Degraded after Second Regeneration and Lost Crystallinity and Effectiveness | | |
| Na Exchanged Hydrogen Zeolite Y | — | — | 45* |

*Average of last three cycles in a five-cycle run. Initial breakthrough time at 1000 ppm was 135 minutes. The breakthrough time was stabilized at the 45 minute level for the third and subsequent run.

The sodium forms of the zeolites, although they do have a good affinity and capacity for hydrogen sulfide and sulfur oxides in the first process cycle, rapidly degrade during the regeneration steps. The many sodium zeolites cannot withstand the sulfur acid environment at a temperature of about 900°F. The crystal structure collapses, and the material loses its adsorptive capacity and catalytic activity for the conversion of hydrogen sulfide and sulfur oxides to elemental sulfur and water. It is also apparent from the Table that a fresh alumina, which is the standard Claus catalyst, is not as effective as zeolites at low sulfur compound concentrations in a feed stream.

What is claimed is:

1. A method of decreasing contaminant sulfurous gases consisting of sulfur oxides and hydrogen sulfide from process effluent gas streams containing less than about 5 volume percent of said sulfurous gases comprising contacting said gas stream with a zone containing a sodium exchanged hydrogen zeolite adsorbent-catalyst at a temperature of about 400°F to 700°F whereby said sulfurous gases are converted to elemental sulfur; continuing contact of said gas stream until said zeolite is substantially loaded with said contaminant sulfurous substances; interrupting the flow of said gas stream; heating said zeolite adsorbent to a temperature of about 800°F to 1000°F to volatilize and remove sulfur from said zeolite, thereby regenerating said zeolite; and repeating the step of contacting said gas stream with said zeolite thereby providing for cyclic operation of the process.

2. A method as in claim 1 wherein said zeolite is sodium exchanged hydrogen mordenite.

3. A method as in claim 2 wherein said gas stream is contacted with said zeolite at a temperature of about 550°F to 650°F and said zeolite is heated to about 850°F to 950°F to remove sulfur and regenerate said zeolite.

4. A method as in claim 1 wherein said zeolite is sodium exchanged hydrogen zeolite Y.

5. A method as in claim 4 wherein said gas stream is contacted with said zeolite at a temperature of about 550°F to 650°F and said zeolite is heated to about 850°F to 950°F to remove sulfur and regenerate said zeolite.

6. A method as in claim 1 wherein said zeolite is sodium exchanged hydrogen ferrierite.

7. A method as in claim 6 wherein said gas stream is contacted with said zeolite at a temperature of about 550°F to 650°F and said zeolite is heated to about 850°F to 950°F to remove sulfur and regenerate said zeolite.

8. A method for removing hydrogen sulfide and sulfur oxides from process gas streams comprising passing said gas stream into a reactor for contact with an alumina catalyst at a temperature of 500°F to 700°F whereby substantial amounts of said hydrogen sulfide and sulfur oxides react to form elemental sulfur and water; flowing low hydrogen sulfide and sulfur oxide content effluent gas from said reactor to a first condenser to remove vaporous elemental sulfur; flowing the effluent gas from said first condenser to a reactor for contact with a sodium exchanged hydrogen zeolite adsorbent-catalyst at a temperature of 400°F to 700°F whereby hydrogen sulfide and sulfur oxides from said effluent gas by conversion to elemental sulfur and water; flowing a gas containing less than 1000 ppm hydrogen sulfide and sulfur oxides to a second condenser to remove vaporous sulfur, and allowing a substantially cleaned gas to flow to the atmosphere.

9. A method as in claim 8 wherein said zeolite is selected from the group consisting of hydrogen mordenite, hydrogen ferrierite, hydrogen zeolite Y, sodium exchanged hydrogen mordenite, sodium exchanged hydrogen ferrierite and sodium exchanged hydrogen zeolite Y.

10. A method as in claim 9 wherein after said zeolite is loaded with elemental sulfur said zeolite is heated to about 800°F to 1000°F to remove sulfur and regenerate said zeolite for reuse for contact with said effluent gas.

* * * * *